(12) United States Patent
Teller et al.

(10) Patent No.: US 10,356,742 B2
(45) Date of Patent: *Jul. 16, 2019

(54) LOCATION-AWARE CACHING IN AN AERIAL NETWORK

(71) Applicant: LOON LLC, Mountain View, CA (US)

(72) Inventors: Eric Teller, San Francisco, CA (US); Richard Wayne DeVaul, Mountain View, CA (US); Clifford L. Biffle, Berkeley, CA (US); Josh Weaver, San Jose, CA (US)

(73) Assignee: LOON LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/662,035

(22) Filed: Jul. 27, 2017

(65) Prior Publication Data
US 2017/0339661 A1 Nov. 23, 2017

Related U.S. Application Data

(63) Continuation of application No. 15/008,274, filed on Jan. 27, 2016, now Pat. No. 9,749,984, which is a
(Continued)

(51) Int. Cl.
*H04W 4/02* (2018.01)
*H04W 64/00* (2009.01)
(Continued)

(52) U.S. Cl.
CPC ...... *H04W 64/003* (2013.01); *H04B 7/18504* (2013.01); *H04B 7/18506* (2013.01);
(Continued)

(58) Field of Classification Search
CPC ....... H04W 4/02; H04W 4/021; H04W 4/023; H04W 4/025
See application file for complete search history.

(56) References Cited

U.S. PATENT DOCUMENTS 2,871,597 A 2/1959 Yost
3,070,335 A 12/1962 Bohl et al.
(Continued)

FOREIGN PATENT DOCUMENTS

| CN | 1925442 A | 3/2007 |
| DE | 4023112 A1 | 1/1992 |

(Continued)

OTHER PUBLICATIONS

Grace, et al. LMDS from High Altitude Aeronautical Platforms, Communications Research Group, Department of Electronics, University of York, United Kingdom, 1999.
(Continued)

*Primary Examiner* — Jeong S Park
(74) *Attorney, Agent, or Firm* — Botos Churchill IP Law LLP

(57) ABSTRACT

Methods and systems are disclosed herein that may help to provide location-aware caching and/or location-specific service profiles in an aerial-vehicle network. An exemplary method may be carried out by an aerial vehicle that is at a location associated with the first geographic area in an aerial-vehicle network that includes a plurality of defined geographic areas, and may involve: (a) determining that a location-aware cache of an aerial vehicle should be updated with user-data associated with the first geographic area; and (b) in response to determining that the location-aware cache should be updated: (i) sending a location-aware cache-update request; (ii) receiving, as a response to the location-aware cache-update request, user-data that corresponds to the first geographic area; and (iii) storing the user-data that corresponds to the first geographic area in a location-aware cache of the aerial vehicle.

20 Claims, 9 Drawing Sheets

Related U.S. Application Data continuation of application No. 14/444,100, filed on Jul. 28, 2014, now Pat. No. 9,282,431, which is a continuation of application No. 13/366,100, filed on Feb. 3, 2012, now Pat. No. 8,825,847.

(51) Int. Cl.
| | |
|---|---|
| *H04W 4/04* | (2009.01) |
| *H04L 29/08* | (2006.01) |
| *H04W 4/021* | (2018.01) |
| *H04W 40/20* | (2009.01) |
| *H04W 28/02* | (2009.01) |
| *H04B 7/185* | (2006.01) |
| *H04W 84/22* | (2009.01) |

(52) U.S. Cl.
CPC .............. *H04L 67/12* (2013.01); *H04L 67/18* (2013.01); *H04L 67/288* (2013.01); *H04L 67/2852* (2013.01); *H04W 4/021* (2013.01); *H04W 4/04* (2013.01); *H04W 28/021* (2013.01); *H04W 40/20* (2013.01); *H04L 67/306* (2013.01); *H04W 4/025* (2013.01); *H04W 84/22* (2013.01)

(56) References Cited

U.S. PATENT DOCUMENTS

| | | | |
|---|---|---|---|
| 4,640,474 A | 2/1987 | Manseth | |
| 5,080,302 A | 1/1992 | Hoke | |
| 5,519,761 A | 5/1996 | Gilhousen | |
| 5,590,395 A | 12/1996 | Diekelman | |
| 5,987,379 A | 11/1999 | Smith | |
| 6,167,263 A | 12/2000 | Campbell | |
| 6,324,398 B1 | 11/2001 | Lanzerotti et al. | |
| 6,744,382 B1 | 6/2004 | Lapis et al. | |
| 7,059,570 B2 | 6/2006 | Strong | |
| 7,275,496 B2 | 10/2007 | French et al. | |
| 7,356,390 B2 | 4/2008 | Knoblach et al. | |
| 7,885,548 B1 | 2/2011 | Nelson et al. | |
| 8,001,902 B2 | 8/2011 | Bass | |
| 8,006,936 B1 | 8/2011 | Farr, III | |
| 8,068,038 B2 | 11/2011 | Engels et al. | |
| 8,116,763 B1 | 2/2012 | Olsen | |
| 8,290,515 B2 | 10/2012 | Staton et al. | |
| 8,566,900 B1 | 10/2013 | Bharali et al. | |
| 8,825,847 B1* | 9/2014 | Teller ...................... | H04W 4/04 709/224 |
| 9,047,769 B2 | 6/2015 | Lafon et al. | |
| 9,281,896 B2* | 3/2016 | Teller ................... | H04B 10/118 |
| 9,282,431 B2* | 3/2016 | Teller ................... | H04W 4/04 |
| 9,749,984 B2* | 8/2017 | Teller ...................... | H04W 4/04 |
| 2002/0072361 A1 | 6/2002 | Knoblach et al. | |
| 2002/0167702 A1 | 11/2002 | Badesha et al. | |
| 2003/0055540 A1 | 3/2003 | Hansen | |
| 2003/0217150 A1 | 11/2003 | Roese et al. | |
| 2003/0236070 A1 | 12/2003 | Seligsohn et al. | |
| 2006/0002326 A1 | 1/2006 | Vesuna | |
| 2006/0003698 A1 | 1/2006 | Seligsohn et al. | |
| 2006/0030345 A1 | 2/2006 | Jain et al. | |
| 2006/0031830 A1 | 2/2006 | Chu et al. | |
| 2006/0063529 A1* | 3/2006 | Seligsohn ................. | B64B 1/44 455/431 |
| 2006/0085106 A1 | 4/2006 | Gaudiano et al. | |
| 2006/0227744 A1* | 10/2006 | Metke ................... | H04W 36/32 370/331 |
| 2007/0021117 A1 | 1/2007 | McKenna et al. | |
| 2007/0112705 A1 | 5/2007 | Mardirossian | |
| 2008/0139114 A1* | 6/2008 | Ranganathan ....... | H04B 5/0062 455/41.1 |
| 2008/0284588 A1 | 11/2008 | Kim et al. | |
| 2008/0299990 A1 | 12/2008 | Knoblach et al. | |
| 2009/0085761 A1 | 4/2009 | Buer | |
| 2009/0098850 A1 | 4/2009 | Deaton | |
| 2009/0224094 A1 | 9/2009 | Lachenmeier | |
| 2010/0121571 A1* | 5/2010 | Cabral ............... | G01C 21/3492 701/414 |
| 2010/0248742 A1 | 9/2010 | Song et al. | |
| 2011/0046817 A1 | 2/2011 | Hamke et al. | |
| 2011/0134781 A1 | 6/2011 | Malnati et al. | |
| 2011/0148634 A1 | 6/2011 | Putz | |
| 2011/0177826 A1* | 7/2011 | Huang .................. | H04W 64/00 455/456.1 |
| 2011/0222047 A1 | 9/2011 | Guetta et al. | |
| 2012/0044710 A1 | 2/2012 | Jones | |
| 2012/0109614 A1 | 5/2012 | Lindores | |
| 2012/0198069 A1 | 8/2012 | Black et al. | |
| 2013/0175387 A1 | 7/2013 | DeVaul et al. | |
| 2013/0177321 A1 | 7/2013 | DeVaul et al. | |
| 2013/0205310 A1 | 8/2013 | Stahl et al. | |
| 2013/0238784 A1 | 9/2013 | Teller et al. | |
| 2014/0014770 A1 | 1/2014 | Teller et al. | |
| 2014/0155093 A1 | 6/2014 | Teller | |
| 2014/0335895 A1 | 11/2014 | Teller et al. | |

FOREIGN PATENT DOCUMENTS

| | | |
|---|---|---|
| EP | 2856664 A1 | 4/2015 |
| JP | 2000177695 A | 6/2000 |
| WO | 0176300 A1 | 10/2001 |
| WO | 2005060509 A2 | 7/2005 |
| WO | 10010452 A1 | 1/2010 |
| WO | 2013181264 A1 | 12/2013 |

OTHER PUBLICATIONS

International Search Report for corresponding PCT application No. PCT/US2013/069866, dated Feb. 28, 2014.
International Search Report for corresponding PCT application No. PCT/US2013/069892, dated Mar. 26, 2014.
International Preliminary Report on Patentability for corresponding PCT application No. PCT/US2013/069892 dated Jun. 9, 2015.
"Echo Balloon Satellites"—Ron Muller, QSS Group, Inc., Apr. 2008 http://www.nicap.org/mantell/SolarSailsConfMuller.pdf. 12 pgs.
"An Integrated Aerial Telecommunications Network that Supports Emergency Traffic"—ARXIV, Jun. 2010 https://arxiv.org/ftp/arxiv/papers/1208/1208.0996.pdf. 5 pgs.
International Search Report and Written Opinion for PCT application No. PCT/US2013/040324, dated Sep. 23, 2013, 12 pgs.
European Patent Office, Extended European Search Report for EP13816293, dated Jul. 24, 2015, 7 pages.
European communication for application No. 13862768.2 dated Jul. 20, 2016. 9 pgs.
European Patent Office, Extended European Search Report for EP13816293, Jul. 17, 2015, 7 pages.

\* cited by examiner

LOCATION-AWARE CACHING IN AN AERIAL NETWORK

CROSS-REFERENCE TO RELATED APPLICATIONS

The present application is a continuation of U.S. patent application Ser. No. 15/008,274, filed on Jan. 27, 2016, which is continuation of U.S. patent application Ser. No. 14/444,100, filed on Jul. 28, 2014, which is a continuation of U.S. patent application Ser. No. 13/366,100, filed on Feb. 3, 2012, the contents of all of which are herein incorporated by reference in their entirety.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, an exemplary computer-implemented method involves: (a) at an aerial vehicle that is at a location associated with the first geographic area in an aerial vehicle network, wherein the aerial vehicle network comprises a plurality of geographic areas, determining that a location-aware cache of an aerial vehicle should be updated with user-data associated with the first geographic area; and (b) in response to determining that the location-aware cache should be updated: (i) sending a location-aware cache-update request; (ii) receiving, as a response to the location-aware cache-update request, user-data that corresponds to the first geographic area; and (iii) storing the user-data that corresponds to the first geographic area in a location-aware cache of the aerial vehicle.

In a further aspect, an exemplary system may include a non-transitory computer-readable medium and program instructions stored on the non-transitory computer-readable medium that are executable by at least one processor. The program instructions may be executable to: (a) determine that a location-aware cache of an aerial vehicle should be updated with user-data associated with a first geographic area of an aerial vehicle network, wherein the aerial vehicle is located at a location associated with the first geographic area, and wherein the aerial vehicle network comprises a plurality of geographic areas; and (b) in response to determining that the location-aware cache should be updated: (i) send a location-aware cache-update request; (ii) receive, as a response to the location-aware cache-update request, user-data that corresponds to the first geographic area; and (iii) store the user-data that corresponds to the first geographic area in a location-aware cache of the aerial vehicle.

In another aspect, an exemplary computer-implemented method involves: (a) in an aerial vehicle network comprising a plurality of aerial vehicles and a plurality of defined geographic areas, a first aerial vehicle determining that user-data from a location-aware cache of the first aerial vehicle should be provided to a second aerial vehicle that is at a location associated with a first geographic area of the aerial vehicle network, wherein the user-data is also associated with the first geographic area; and (b) in response to determining that the user-data from the location-aware cache should be provided to the second aerial vehicle: (i) sending a location-aware cache-update message to the second aerial vehicle, wherein the location-aware cache-update message indicates that the aerial vehicle should update a locate-aware cache of the aerial vehicle with user-data corresponding to the first geographic area; and (ii) initiating a transmission to the first aerial vehicle of the user-data corresponding to the first geographic area.

In yet another aspect, an exemplary computer-implemented method involves: (a) determining that a location-aware cache of an aerial vehicle should be updated, wherein the aerial vehicle is at a location associated with a first geographic area of an aerial vehicle network that comprises a plurality of geographic areas; and (b) in response to determining that the location-aware cache of the aerial vehicle should be updated: (i) sending the aerial vehicle a location-aware cache-update message, wherein the location-aware cache-update message indicates that the aerial vehicle should update a locate-aware cache of the aerial vehicle with user-data corresponding to the first geographic area; and (ii) initiating a transmission to the aerial vehicle of the user-data corresponding to the first geographic area.

In a further aspect, an exemplary system may include a non-transitory computer-readable medium and program instructions stored on the non-transitory computer-readable medium that are executable by at least one processor. The program instructions may be executable to: (a) determine that a location-aware cache of an aerial vehicle should be updated, wherein the aerial vehicle is at a location associated with a first geographic area of an aerial vehicle network that comprises a plurality of geographic areas; and (b) in response to determining that the location-aware cache of the aerial vehicle should be updated: (i) send the aerial vehicle a location-aware cache-update message, wherein the location-aware cache-update message indicates that the aerial vehicle should update a locate-aware cache of the aerial vehicle with user-data corresponding to the first geographic area; and (ii) initiate a transmission to the aerial vehicle of the user-data corresponding to the first geographic area.

These as well as other aspects, advantages, and alternatives, will become apparent to those of ordinary skill in the art by reading the following detailed description, with reference where appropriate to the accompanying drawings.

DETAILED DESCRIPTION

Figure 1:
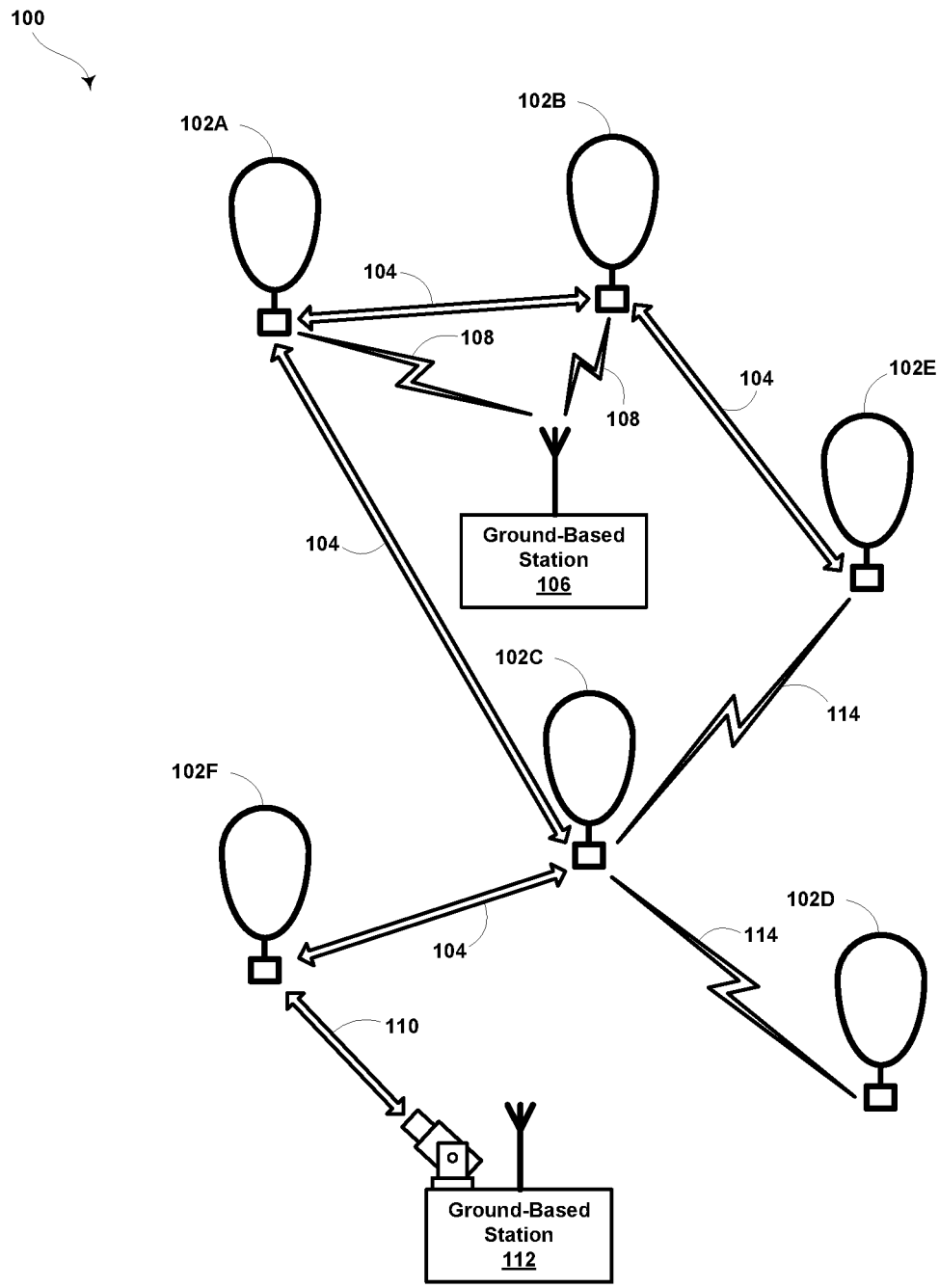
FIG. 1 is a simplified block diagram illustrating a balloon network, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

Exemplary embodiments may be implemented in association with a data network that includes a plurality of balloons; for example, a mesh network formed by high-altitude balloons deployed in the stratosphere. Since winds in the stratosphere may affect the locations of the balloons in a differential manner, each balloon in an exemplary network may be configured to change its horizontal position by adjusting its vertical position (i.e., altitude). For example, by adjusting its altitude, a balloon may be able find winds that will carry it horizontally (e.g., latitudinally and/or longitudinally) to a desired horizontal location.

In an exemplary balloon network, balloons may move latitudinally and/or longitudinally relative to one another so as to form a desired topology. However, keeping an individual balloon at a specific location may be difficult due to winds, and possibly for other reasons as well. Accordingly, the desired topology may define a relative framework and/or rules for positioning of balloons relative to one another, such that balloons can move with respect to the ground, while maintaining the desired topology. Thus, at a given location on earth, the particular balloon or balloons that provide service may change over time.

In this context, where the particular balloon or balloons that serve a given geographic location may change over time, it may be desirable to provide caching features that, from the perspective of the end user, appear to be substantially the same as caching features in an access network where access points remain stationary. Therefore, in an exemplary embodiment, balloons may implement location-aware caching, such that a cache of user-data is tied to a particular geographic area, rather than being tied to the network entity or entities in which the cache is stored (e.g., rather than being tied to balloons that store the cache).

In particular, balloons may each maintain a location-aware cache (which may also be referred to as a "ghost" cache), which is periodically updated to include user-data for area in which the balloon is located at the time. By doing so, the cached data that is available to a client device while located in a given geographic area can remain substantially the same, regardless of which balloons are serving the area at the time. Various types of user-data may be stored in a location-aware cache for a given geographic area. For example, the user-data for a given geographic area may include data that has been routed to or from end-user devices that are located in or otherwise associated with the geographic area, meta-data associated with end-user devices and/or users that are located in or otherwise associated with the geographic area, and/or session data from communication sessions involving end-user devices and/or users that are located in or otherwise associated with the area, among other possible types of user-data.

It may also be desirable to provide continuity in service and performance in a certain geographic area of a balloon network, even when the balloons that serve the area change over time. Accordingly, location-specific "ghost" service profiles may be defined, which each provide operating parameters that are specific to a particular geographic area. As such, any balloon that moves into a particular geographic area may configure itself to operate according to the area's service profile for as long as it remains in the area. Further, the location-specific service-profiles may be shared between balloons. As such, when a balloon moves into a given geographic area, it can acquire the service-profile for the area from other balloons that are already operating in the area.

A location-specific service profile for a given geographic area may specify various states, configurations, and/or operating parameters for balloons that operate in the area. For example, a location-specific service profile may specify a communication protocol to be used by balloons operating in a particular geographic area. As another example, a location-specific service profile could specify a power-usage profile to be used by balloons operating in a particular geographic area (e.g., whether the balloon can should use more or less power than typical while located in the area). Other examples are possible as well.

In a further aspect, in an exemplary balloon network, balloons may coordinate with one another to "hand off" user-data for location-aware caching and/or location-specific user-profiles, such that when a balloon moves into a certain geographic area, the balloon can obtain user-data for the area from other balloons that have already populated their respective location-aware caches with user-data from the area. Alternatively, a centralized ground-based station may send the cache for a given geographic area to balloons as they enter or are approaching the area. Other implementations are possible as well.

Note that in an exemplary embodiment, the geographic areas for location-aware caching and location-specific service profiles will typically be defined independently from the coverage reach resulting from the a current positioning of the balloons (e.g., from a given state of the network). As such, balloons that implement location-aware caching can update their respective caches as they move in and out of the defined geographic areas, such that whichever balloon or balloons are in a geographic area can provide the same or a similar cache of user-data while the in the geographic area. Thus, while balloons might move between geographic areas, users in a given geographic area may be provided with caching functionality that replicates, or at least comes close to replicating, the caching functions of a fixed access point.

In some embodiments, balloons may implement location-aware caching based on fixed geographic areas that are defined by specific geographic coordinates that remain the same over time. However, in other embodiments, location-aware caching may be implemented with respect to a moving geographic area. A moving geographic area may be defined by, e.g., a moving object or person. Therefore, a moving geographic area is also defined independently from the coverage reach resulting from the positioning of the balloons. For instance, a moving geographic area could be defined around a vehicle capable of changing its location (e.g., cars, trains, cruise ships, etc.). Further, a moving geographic area might even be defined around a certain person or group of people, such that a cache of the person or group's user-data could follow them as they move around geographically.

Implementation of location-aware caching may provide various benefits to end users who access a balloon network in various different geographic areas. To provide one example, consider two adjacent geographic areas, which include a first geographic area on the French side of the border of France and Italy and a second geographic area on the Italian side of the border. End users in France may access significantly more French-language websites than end users in Italy, while end users in Italy may access significantly more Italian-language websites than end users in France.

Now consider a first balloon that is initially positioned over the first geographic area (in France), and a second balloon that is initially positioned over the second geographic area (in Italy). When the first balloon is located in the first geographic area, it may populate and/or maintain its location-aware cache with user-data from the end users in the first geographic area, which may include a significant number of French-language websites. Accordingly, when the French end-users in the first geographic area access such French-language websites, the cached versions may allow the websites to be provided more rapidly. Similarly, when the second balloon is located in the second geographic area, it may populate and/or maintain its location-aware cache with user-data from the end users in the second geographic area, which may include a significant number of Italian-language websites. Accordingly, when the Italian end-users in the second geographic area access such Italian-language websites, the cached versions may allow the websites to be provided more rapidly.

If the first balloon later moves into the second geographic area (i.e., moves across the France-Italy border into Italy), it may populate and/or maintain its location-aware cache with user-data from the Italian end users in the second geographic area. Further, at or near the time when the first balloon moves into the second geographic area, the second balloon may move from second coverage area into the first area. Accordingly, the second balloon may populate and/or maintain its location-aware cache with user-data from the French end users in the first geographic area. In addition, the first balloon may remove the previously-stored French-language websites from its location-aware cache, and the second balloon may remove the previously-stored Italian-language websites from its location-aware cache. Thus, the location-aware cache of the first balloon now provides the first geographic area with the same or similar user-data as was previously provided by the location-aware cache of the second balloon, while the location-aware cache of the second balloon now provides the second geographic area with the same or similar user-data as was previously provided by the location-aware cache of the first balloon. Therefore, from the end user's perspective, the cache in a given geographic area remains substantially the same; regardless of which balloon is serving the area at a given point in time.

It should be understood that the above is but one exemplary application, and that many other applications and variations on the above-described application are possible.

II. Exemplary Balloon Networks

An exemplary embodiment may be implemented in association with various types of balloon networks. For instance, in an exemplary balloon network, the balloons may communicate with one another using free-space optical communications. As an example, the balloons may be configured for optical communications using ultra-bright LEDs (which are also referred to as "high-power" or "high-output" LEDs). In some instances, lasers could be used instead of or in addition to LEDs, although regulations for laser communications may restrict laser usage. In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network may additionally be configured to communicate with ground-based station(s) using RF communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons (i.e., two or more types of balloons that function in substantially different ways). For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an exemplary embodiment, can be configured to communicate via optical links with ground-based stations and/or satellites.

In an exemplary configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an exemplary embodiment. As shown, balloon network 100 includes balloons 102A to 102F, which are configured to communicate with one another via free-space optical links 104. Configured as such, balloons 102A to 102F may collectively function as a mesh network for packet-data communications. Further, at least some of balloons 102A and 102B may be configured for RF communications with ground-based stations 106 via respective RF links 108. Yet further, some balloons, such as balloon 102F, may be configured to communicate via optical link 110 with ground-based station 112.

In an exemplary embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has relatively low wind-speeds (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an exemplary embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of exemplary balloons are discussed in greater detail below, with reference to FIG. 3.

In a further aspect, balloons 102A to 102F may utilize one or more of various different RF air-interface protocols for communication with ground-based stations 106 via respective RF links 108. For instance, some or all of balloons 102A to 102F may be configured to communicate with ground-based stations 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may scenarios where RF links 108 do not provide a desired link capacity for balloon-ground communications. For instance, increased capacity may be desirable to provide backhaul links from a ground-based gateway, and in other scenarios as well. Accordingly, an exemplary network may also include downlink balloons, which provide a high-capacity air-ground link.

For example, in balloon network 100, balloon 102F is configured as a downlink balloon. Like other balloons in an exemplary network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 108.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 108, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link. As such, a ground-based station 106 may be configured as an access point via which various devices can connect to balloon network 100. Ground-based stations 106 may have other configurations and/or serve other purposes without departing from the scope of the invention.

In a further aspect, some or all balloons 102A to 102F could be configured to establish a communication link with space-based satellites in addition to, or as an alternative to, a ground-based communication link. In some embodiments, a balloon may communicate with a satellite via an optical link. However, other types of satellite communications are also possible.

Further, some ground-based stations, such as ground-based station 108, may be configured as gateways between balloon network 100 and one or more other networks. Such a ground-based station 108 may thus serve as an interface between the balloon network and the Internet, a cellular service provider's network, and/or other types of networks. Variations on this configuration and other configurations of a ground-based station 108 are also possible.

A. Mesh-Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

B. Station-Keeping Functionality

In an exemplary embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an exemplary balloon network may be adaptable. In particular, station-keeping functionality of exemplary balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
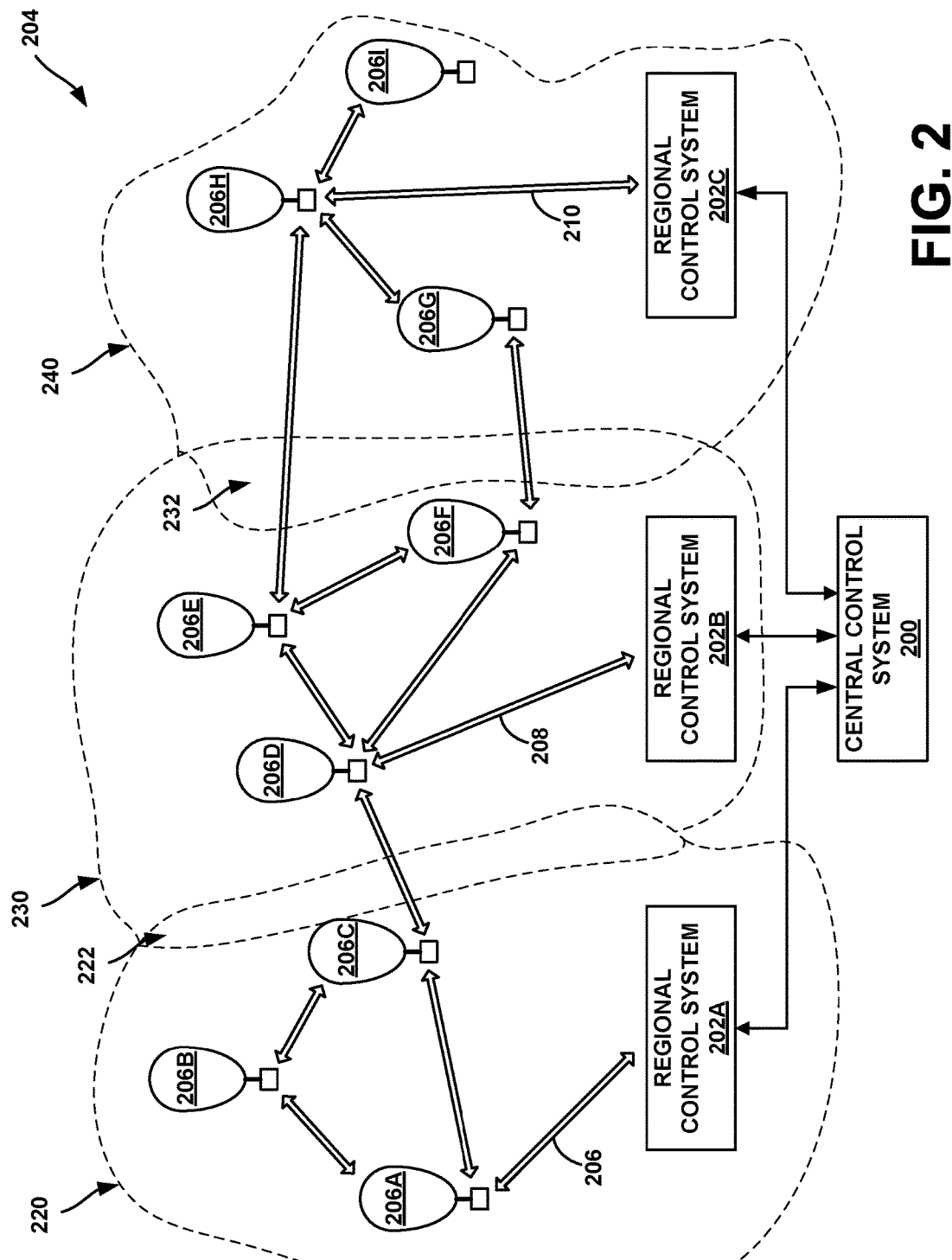
FIG. 2 is a block diagram illustrating a balloon-network control system, according to an exemplary embodiment.

In some embodiments, mesh networking and/or station-keeping functions may be centralized. For example, FIG. 2 is a block diagram illustrating a balloon-network control system, according to an exemplary embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B-E and 206G-H. However, it should be understood that it in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202B may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

D. Defined Geographic Areas within a Balloon Network

In a further aspect, which is illustrated by FIG. 2, a balloon network may serve a coverage area that is subdivided into a number of defined geographic areas 220 to 240. Further, while FIG. 2 illustrates three defined geographic areas 220 to 240, more or less geographic areas may be defined, without departing from the scope of the invention. Yet further, while geographic areas 220 to 240 are shown as distinct coverage areas that do not overlap, it is possible that two or more geographic areas may be defined so as to overlap (at least partially).

In an exemplary embodiment, each balloon 206A to 206I may include a location-aware cache, in which the balloon stores user-data that is associated with the respective geographic area 220 to 240 in which the balloon is located. For example, in the illustrated state of balloon network 204, balloons 206A to 206C may each store user-data that is associated geographic area 220, balloons 206D to 206F may each store user-data that is associated geographic area 230, and balloons 206G to 206I may each store user-data that is associated geographic area 240.

Further, when a given balloon 206A to 206I moves from one geographic area to another, the balloon may update its cache accordingly. For instance, if balloon 206C were to move from its location shown in FIG. 2, in geographic area 220, to geographic area 230, balloon 206C may update its location-aware cache by storing user-data associated with geographic area 230. At the same time, or after waiting some predetermined time after moving into geographic area 230, balloon 206C may also delete user-data associated with other geographic areas (e.g., geographic area 220) from its location-aware cache.

In a further aspect that is illustrated by FIG. 2, the coverage area of balloon network may include defined border areas, which separate the defined geographic areas. In the illustrated embodiment, geographic areas 220 and 230 are separated by border area 222, while geographic areas 230 and 240 are separated by border area 232. Note that a border area may also be treated as an area where two or more coverage areas overlap, rather than a distinct area that separates two adjacent coverage areas. For instance, border area 222 may be created by defining geographic areas 220 and 230 such that these geographic areas overlap in border area 222.

In some embodiments, a balloon 206A to 206I may update (or begin to update) its location-aware cache when it moves into a border area 222 or 232. More specifically, a border area in a given geographic area may be associated with the adjacent geographic areas that it separates. Accordingly, when a balloon moves into a border area, it may update its location-aware cache with user-data from the coverage area or areas associated with the border area, for which the balloon has not already stored user-data. For example, a balloon 206C may detect that it has moved from the location illustrated in FIG. 2 (with geographic area 220) to a location within border area 222, and responsively update its location-aware cache. In particular, since presumably, balloon 206C will have already stored user-data associated with geographic area 220 in its location-aware cache, balloon 206C will begin storing user-data associated with the adjacent geographic area 230 in its location-aware cache.

In a further aspect, a balloon may keep previously-stored user-data in its location-aware cache while it is located in a border area. For example, in the above scenario, if balloon 206C moves into border area 222, it may keep some or all user-data from geographic area 220 in its location-aware cache, while at the same time updating its location-aware cache with user-data from geographic area 230.

Further, after a balloon 206A to 206I moves into a border area 222 or 232, the balloon may wait until it moves out of the border area, and is fully within one of the adjacent coverage areas, before removing user-data from a geographic area in which it is not located. For example, while balloon 206C is located in border area 222 it may have updated its location-aware cache, which already included user-data from geographic area 220, to also include user-data from geographic area 230. Then, if balloon 206C moves into geographic area 230, it may remove (or begin removing) user-data from geographic area 220 from its location-aware cache. Alternatively, if balloon 206C were to move back into geographic area 220, it may responsively remove (or begin removing) user-data from geographic area 230 from its location-aware cache.

Note that while the coverage area illustrated in FIG. 2 includes border areas that separate defined geographic areas, geographic areas may be defined without defining border areas. For instance, border areas may be a result of defining overlapping geographic areas, as described above. Alternatively, there may be no border areas whatsoever (either defined specifically or as a result of overlapping geographic areas).

In a further aspect, the geographic areas (and border areas, if any) may be defined so as to create a substantially contiguous coverage area. For instance, in the illustrated balloon network 204, geographic areas 220 to 240 and border areas 222 to 232 subdivide a substantially contiguous coverage area. However, it should be understood that the coverage of a balloon network may also extend to locations that are not part of any defined geographic area or border area, without departing from the scope of the invention.

To update its location-aware cache, a given balloon 206A to 206I may send a location-aware cache-update request to one or more of the other balloons in balloon network 204. The location-aware cache-update request may indicate a current location of the requesting balloon (such that a receiving balloon can determine which geographic area the request is for), or may specifically indicate the geographic area for which a cache update is being requested. A balloon that receives location-aware cache-update request may respond by sending the user-data stored in its location-aware cache to the requesting balloon.

In some implementations, a balloon 206A to 206I may specifically send location-aware cache-update requests to a balloon or balloons that are located in the geographic area for which user-data is desired. In such an embodiment, a balloon that receives a location-aware cache-update request may assume that it has user-data for the desired geographic area in its location-aware cache. In such an embodiment, the requesting balloon may not include an indication of its location, or an indication of the geographic area for which user-data is desired, in a location-aware cache-update. Further, the receiving balloon may respond to the request by automatically sending the user-data stored in its cache, without further verifying whether the user-data is associated with the desired geographic area.

In some implementations, however, a balloon 206A to 206I that receives a location-aware cache-update request may first determine whether it has user-data associated with the desired geographic area, before responding to the location-aware cache-update request. If the location-aware cache of the receiving balloon includes user-data associated with the desired geographic area, the receiving balloon may respond by sending the requesting balloon user-data stored in its own location-aware cache. On the other hand, if the receiving balloon does not have user-data associated with the desired geographic area, then the receiving balloon may refrain from sending user-data from its location-aware cache. Further, the receiving balloon may or may not send the requesting balloon a message indicating that it does not have user-data associated with the desired geographic area.

In some embodiments, balloons may request and/or receive user-data for certain geographic areas from one or more ground-based systems. For example, a control system may maintain a user-data database, which includes user-data for one or more defined geographic areas. Such a user-data database may be searchable by geographic area. As such, a control system may query the user-data database to retrieve the user-data that is associated with a particular geographic area. Further, there may be a single, central, user-data database, or a number of separate user-data databases that collectively provide user-data for all geographic areas in a balloon network.

In some embodiments, the control system may be central control system that provides user-data for all geographic areas in a balloon network. In other embodiments, there may be a number of regional control systems, which may operate independently or may communicate with a central control system that coordinates and/or controls certain functions of the regional systems, such as is illustrated in FIG. 2.

More specifically, in the configuration illustrated in FIG. 2, regional control systems 202A to 202C may provide access to user-data that is associated with geographic areas 220 to 240, respectively. Accordingly, a balloon may update its location-aware cache with user-data from a given geographic area 220 to 240 by communicating with the regional control system that is associated with the given geographic area.

Further, to update its location-aware cache, a balloon may communicate directly with a regional control system 202A to 202C or indirectly via other balloons. For example, in the illustrated state of balloon network 204, if balloon 206A desires user-data associated with geographic area 220, then balloon 206A may send a location-aware cache-update request to regional control system 202A. However, if balloon 206C, desires user-data associated with geographic area 220, then balloon 206C may send a location-aware cache-update request to regional control system 202A indirectly; e.g., via balloon 206A or via balloon 206B and 206A.

In some embodiments, a control system or systems may detect when a balloon 206A to 206I should update its cache, and responsively notify the balloon. Therefore, in such an embodiment, the balloon may not need to send a location-aware cache-update request in order to update its cache. For example, a control system, such as one of regional control systems 202A to 202C, may determine that a balloon is at a location that is associated with a first geographic area of the balloon network, and responsively send the balloon a location-aware cache-update message.

Note that to facilitate a control system detecting when a location-aware cache update is desirable, a given balloon 206A to 206I may periodically send location update messages, which indicate the balloon's current location, to a control system or control systems in its current geographic area and/or in nearby geographic areas. As such, when a control system determines, determines that the balloon has moved from a location that is not associated with a given geographic area to a location within the geographic area, the control system may responsively send a location-aware cache-update message that indicates that the balloon should update its locate-aware cache with user-data corresponding to the geographic area. Further, the control system may initiate a transmission to the balloon of the user-data corresponding to the geographic area.

Further, the control system or control systems may repeat this process as a balloon 206A to 206I moves from geographic area to geographic area. For example, consider a balloon that was located in a first geographic area (e.g., geographic area 220). If the control system subsequently determines that the balloon is located at a second location, which associated with a second geographic area of the balloon network (e.g., geographic area 230), the control system may responsively send the balloon a location-aware cache-update message that indicates that the balloon should update its location-aware cache with user-data corresponding to the second geographic area, and further, may transmit the user-data corresponding to the second geographic area to the balloon.

Further, in the above scenario where a control system determines that the balloon is located at a second location, the control system may further indicate to the balloon to remove user-data that corresponds to the first geographic area, from the balloon's location-aware cache. The timing of the indication to delete user-data from a previous geographic area may be immediately responsive to determining that the balloon has entered a new geographic area or may be delayed by a predetermined period of time.

Yet further, when border areas exist between geographic areas (or exist where geographic areas overlap), a control system may facilitate and/or control location-aware cache updates as a balloon moves into and/or out of border areas, in a similar manner as described above.

Even further, it should be understood that, while each regional control system 202A to 202C is shown as coordinating location-aware cache updates for balloons in one geographic area, a single control system could facilitate location-aware cache updates in a number of the geographic areas in a balloon network; or possibly even in all geographic areas in the network. Further, in some embodiments, two or more control systems could all facilitate location-aware cache updates in the same geographic area or areas.

E. Exemplary Balloon Configuration

Figure 3:
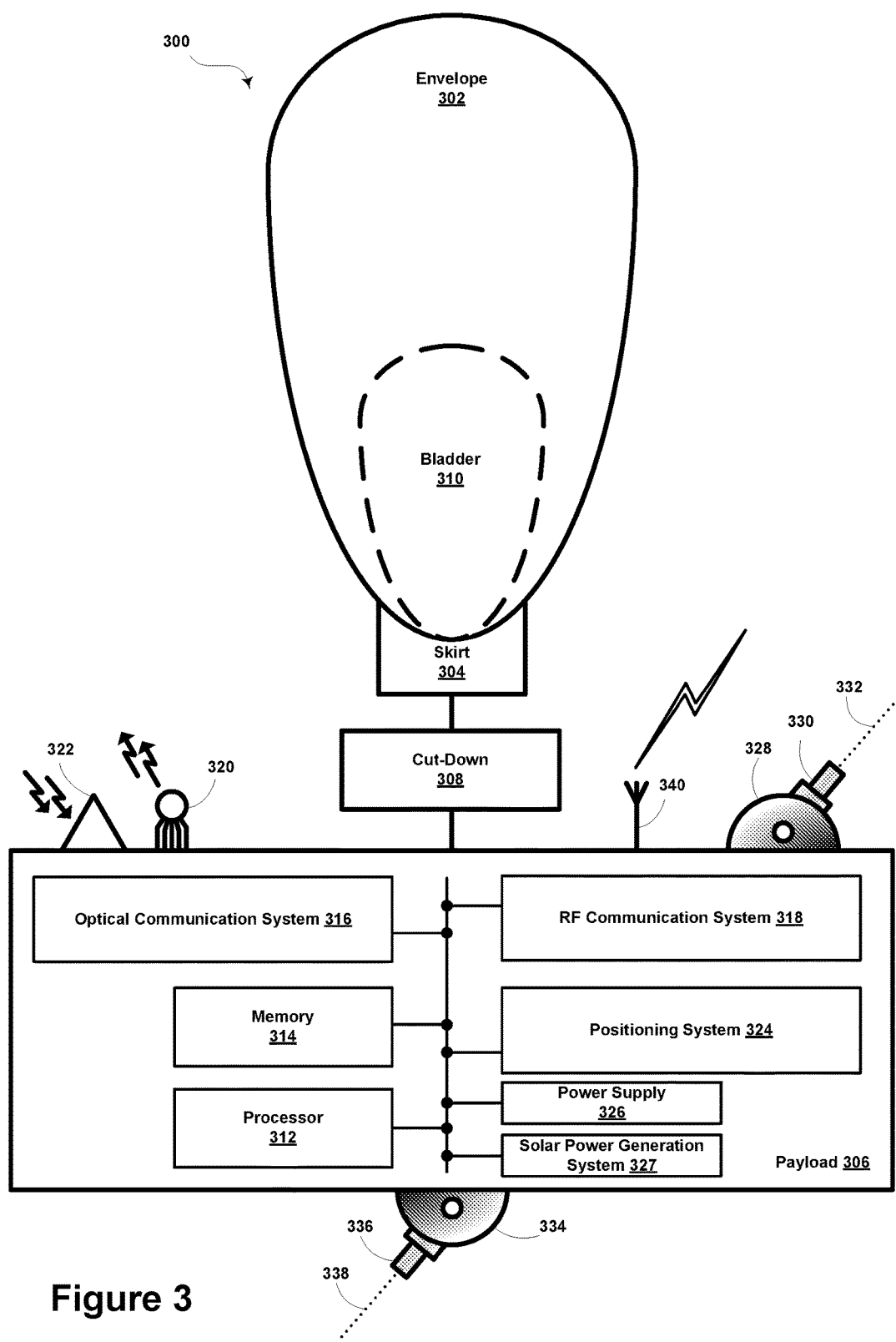
FIG. 3 shows a high-altitude balloon, according to an exemplary embodiment.

Various types of balloon systems may be incorporated in an exemplary balloon network. As noted above, an exemplary embodiment may utilize high-altitude balloons, which typically operate in an altitude range between 18 km and 22 km. FIG. 3 shows a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, which may be currently well-known or yet to be developed. For instance, the envelope 302 and/or skirt 304 may be made of metalized Mylar or BoPet. Alternatively or additionally, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver (e.g., a photo-diode receiver system). Further, payload 306 may include an RF communication system 318, which may transmit and/or receive RF communications via an antenna system 324.

The payload 306 may also include a power supply 326 to supply power to the various components of balloon 300. The power supply 326 may include or take the form of a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

Further, payload 306 may include various types of other systems and sensors 328. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 306 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an exemplary embodiment, the cut-down system 308 may include a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302. Other types of cut-down systems and/or variations on the illustrated cut-down system 308 are possible as well.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground. In yet other embodiments, balloons may be serviced in-flight by specific service balloons or another type of service aerostat or service aircraft.

III. Balloon Network with Optical and RF Links between Balloons

In some embodiments, a high-altitude-balloon network may include super-node balloons, which communicate with one another via optical links, as well as sub-node balloons, which communicate with super-node balloons via RF links.

Figure 4:
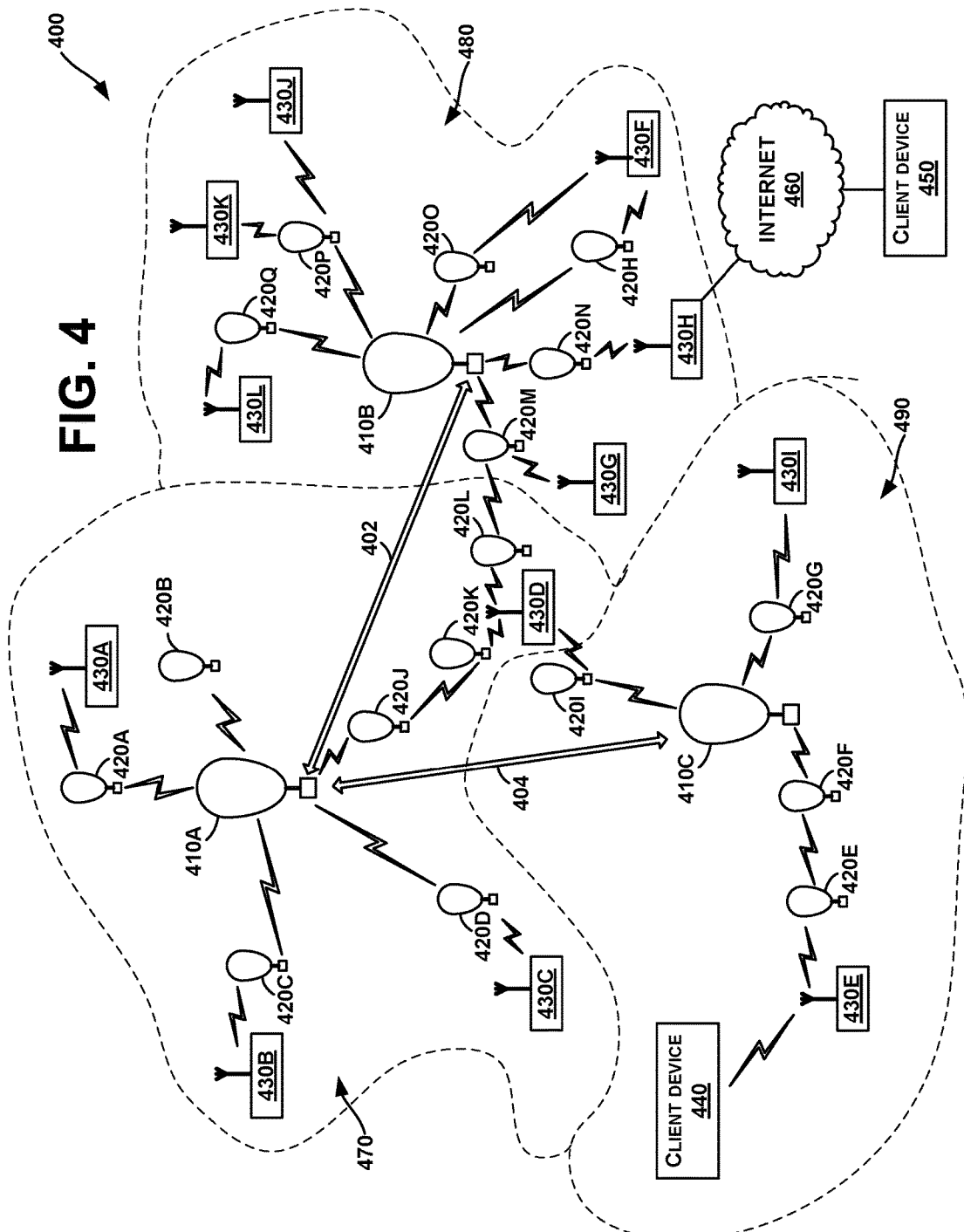
FIG. 4 is a simplified block diagram illustrating a balloon network that includes super-nodes and sub-nodes, according to an exemplary embodiment.

FIG. 4 is a simplified block diagram illustrating a balloon network that includes super-nodes and sub-nodes, according to an exemplary embodiment. More specifically, FIG. 4 illustrates a portion of a balloon network 400 that includes super-node balloons 410A to 410C (which may also be referred to as "super-nodes") and sub-node balloons 420A to 420Q (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420A to 420Q may include a radio-frequency (RF) communication system that is operable for packet-data communication over one or more RF air interfaces. Accordingly, some or all of the super-node balloons 410A to 410C may include an RF communication system that is operable to route packet data to one or more nearby sub-node balloons 420A to 420Q. When a sub-node 420A receives data from a super-node 410A via an RF link, the sub-node 420A may in turn use its RF communication system to transmit the received data to a ground-based station 430A to 430L via an RF link.

In some embodiments, all sub-node balloons may be configured to establish RF links with ground-based stations. For example, all sub-nodes may be configured similarly to sub-node 420A, which is operable to relay communications between super-node 410A and a ground-based station 430A via respective RF links.

In other embodiments, some or all sub-nodes may also be configured to establish RF links with other sub-nodes. For instance, in the illustrated embodiment, sub-node balloon 420F is operable to relay communications between super-node 410C and sub-node balloon 420E. In such an embodiment, two or more sub-nodes may provide a multi-hop path between a super-node balloon and a ground-based station, such as the multi-hop path provided between super-node 410C and a ground-based station 430E by sub-node balloons 420E and 420F.

Note that an RF link may be a directional link between a given entity and one or more other entities, or may be part of an omni-directional broadcast. In the case of an RF broadcast, it is possible that one or more "links" may be provided via a single broadcast. For example, super-node balloon 410A may establish a separate RF link with each of sub-node balloons 420A, 420B, and 420C. However, in other implementations, super-node balloon 410A may broadcast a single RF signal that can be received by sub-node balloons 420A, 420B, and 420C. In such an implementation, the single RF broadcast may effectively provide all of the RF links between super-node balloon 410A and sub-node balloons 420A, 420B, and 420C. Other examples are also possible.

Generally, the free-space optical links between super-node balloons have more bandwidth capacity than the RF links between super-node balloons and sub-node balloons. Further, free-space optical communication may be received at a much greater distance than RF communications. As such, the super-node balloons 410A to 410C may function as the backbone of the balloon network 400, while the sub-nodes 420A to 420Q may provide sub-networks providing access to the balloon network and/or connecting the balloon network to other networks.

As noted above, the super-nodes 410A to 410C may be configured for both longer-range optical communication with other super-nodes and shorter-range RF communications with nearby sub-nodes 420. For example, super-nodes 410A to 410C may use high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 Gbit/sec.

A larger number of high-altitude balloons may then be configured as sub-nodes, which may communicate with ground-based Internet nodes at data rates on the order of approximately 10 Mbit/sec. For instance, in the illustrated implementation, the sub-nodes 420A to 420Q may be configured to connect the super-nodes 410A to 410C to other networks and/or directly to client devices. Note that the data rates and link distances described in the above example and elsewhere herein are provided for illustrative purposes and should not be considered limiting; other data rates and link distances are possible.

In a further aspect, some or all of the super-node balloons may be configured as downlink balloons. Additionally or alternatively, some or all of sub-nodes 420A to 420Q may be configured as downlink balloons. Further, it is possible that a hierarchical balloon network such as that shown in FIG. 4 may be implemented without any downlink balloons.

Further, in some embodiments, the super-node balloons, such as super-nodes 410A to 410C, may function as a core network (i.e., a backbone network), while the sub-node balloons 420A to 420Q may function as one or more access networks to the core network of super-nodes. In such an embodiment, some or all of the sub-nodes 420A to 420Q may also function as gateways to the balloon network 400. Note also that in some embodiments, some or all of the ground-based stations 430A to 430L may additionally or alternatively function as gateways to balloon network 400.

In another aspect, it should be understood that the network topology of the hierarchical balloon network shown in FIG. 4 is but one of many possible network topologies. Further, the network topology of an exemplary balloon network may vary dynamically as super-node and/or sub-node balloons move relative to the ground and/or relative to one another. Further, as with the balloon networks illustrated in FIGS. 1 and 2, a desired topology may be specified for a hierarchical balloon network may change dynamically over time as service needs and/or goals of the network change.

Location-aware caching may also be implemented in a heterogeneous balloon network, such as balloon network 400. For example, as shown in FIG. 4, the geographic areas 470, 480, and 490 may be defined for balloon network 400.

In an embodiment where super-node balloons 410A to 410C serve as a core network, and sub-node balloons 420A to 420Q provide an access network or access networks, location-aware caches may be maintained only by the sub-node balloons 420A to 420Q. Alternatively, both super-node balloons 410A to 410C and sub-node balloons 420A to 420Q can maintain location-aware caches in the same or a similar manner.

Further, in some embodiments, a super-node balloon 410A to 410C may facilitate location-aware cache updates for some or all of sub-node balloons 420A to 420Q. For example, each super-node balloon 410A to 410C may include or have access to a location aware cache for a certain geographic area 470 to 490, respectively. In such an embodiment, a sub-node balloon in a geographic may not itself maintain a location-aware cache. Instead, a sub-node balloon may query the super-node balloon for user-data that is associated with the geographic area in which it located. Alternatively, a super-node balloon 410A to 410C may function as a control system, in a similar manner as described above in reference to FIG. 2.

IV. Exemplary Methods for Location-Aware Caching

A. Balloon-Initiated Method for Location-Aware Caching

Figure 5A:
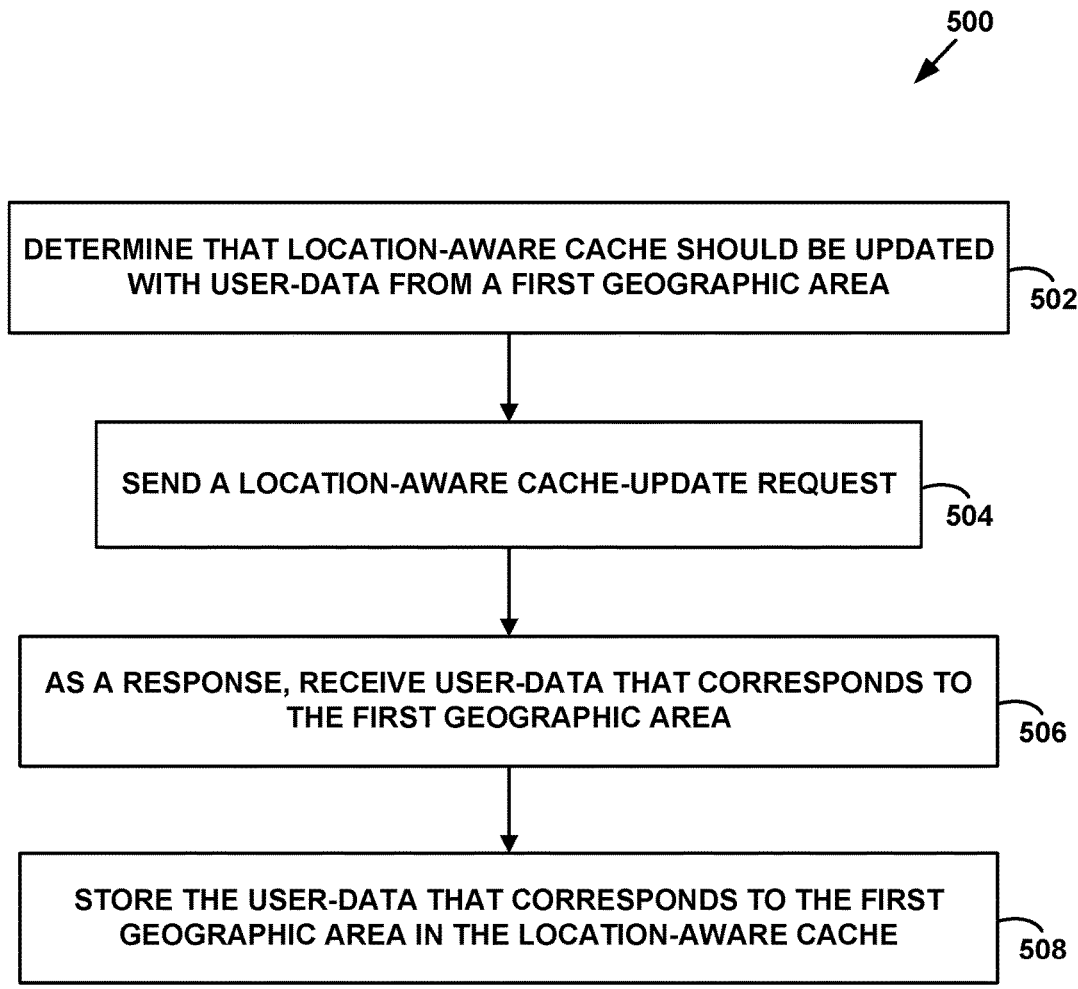
FIG. 5A is a simplified flow chart illustrating a method, according to an exemplary embodiment.

FIG. 5A is a simplified flow chart illustrating a method 500, according to an exemplary embodiment. Method 500 may be implemented by a balloon in a balloon network to maintain and/or update a location-aware cache, and possibly for other purposes as well or instead.

As shown in block 502 of method 500, when a balloon is at a location associated with a first geographic area of a balloon network, the balloon may determine that the balloon's location-aware cache should be updated with user-data from the first geographic area. In response to this determination, the balloon may send a location-aware cache-update request, which may include an indication of the first geographic area, as shown by block 504. As a response to the location-aware cache-update request, the balloon may receive user-data that corresponds to the first geographic area, as shown by block 506. The balloon may then store the user-data that corresponds to the first geographic area in the balloon's location-aware cache, as shown by block 508.

As noted above, various types of user-data may be included in a location-aware cache. For example, the user-data for a given geographic area may include data that has been routed to or from end-user devices that are located in or otherwise associated with the area and/or meta-data associated with end-user devices and/or users that are located in or otherwise associated with the area.

Additionally or alternatively, user-data in a location-aware cache may include session data from communication sessions involving end-user devices and/or users that are located in or otherwise associated with the area. For instance, a balloon that is facilitating or serving a bandwidth intensive session (e.g., a streaming video) for a user, could buffer session data (e.g., video). As such, when the balloon moves out of the geographic area in which the user is located, the buffered session data may be sent to another balloon that is about to enter the area, so that it can continue the session with the user. Alternatively, the other balloon may communicate with a session server to start fetching and buffering data from the same session (e.g. a video buffer including the next 20 seconds of the movie), so that it has the data buffer available in its location-aware cache when it moves into the area in which the user is located.

i. Determining that the Location-Aware Cache Should be Updated

At block 502 of an exemplary method 500, a balloon may use various techniques to determine that should update its location-aware cache with user-data for the first geographic area. For example, a balloon may detect when it moves from a location that is not associated with a first geographic area (e.g., that is outside the first geographic area), to a location within the first geographic area. When this occurs, the location-aware cache of the balloon will likely have user-data that is associated with a previous geographic area and, further, may need to be updated with user-data from the first geographic area. Accordingly, when the balloon detects that it has moved into a new geographic area, the balloon may respond by proceeding to send a location-aware cache-update request at block 504.

In some implementations, block 502 may involve the balloon detecting a movement of the balloon into a border area of the first geographic area, from a location that is not associated with the first geographic area (e.g., from a location that is outside the border area and in another geographic area), such as is described above in reference to FIG. 2. When the balloon moves into a border area of a geographic area, this may be interpreted to mean that the balloon is moving towards the geographic area. Accordingly, a balloon may respond to movement into a border area by sending a location-aware cache-update request at block 504.

Note that when a balloon moves into a border area, a balloon may also check its previous, current, and/or planned direction of movement to verify that it is heading towards the first geographic area. Further, based on the previous, current, and/or planned direction of movement, the balloon may determine the probability that it will move into the first geographic area. As such, the balloon may condition the transmission of a location-aware cache-update request at block 504, upon a determination that the probability of moving into the first geographic area is greater than a threshold probability.

In another aspect, to determine when to update its location-aware cache, a balloon may run a background process to monitor its location and detect when it moves into a new geographic area and/or when it moves into a border area, and should therefore update its location-aware cache.

ii. Acquiring User-Data for an Update to the Location-Aware Cache

In some embodiments, balloons in a balloon network may implement method 500 to coordinate with one another in maintaining their respective location-aware caches. In such an embodiment, block 504 may involve the balloon sending a location-aware cache-update request to one or more other balloons in the balloon network. The balloon or balloons that receive the request may have been located within the geographic area long enough to store user-data from the geographic area, and accordingly may send the user-data from their location-aware cache to the requesting balloon.

In some embodiments, all balloons in a given geographic area may coordinate sharing of user-data from the geographic area with other balloons in an effort to achieve a uniform location-aware cache in all balloons in the geographic area. For example, each balloon may share selected user-data that is routed through the balloon with all the other balloons, so that all the balloons can store the user-data locally, in their respective location-aware caches. Theoretically, this can result in each balloons in the geographic area having the same user-data in its location-aware cache. It should be understood that, in practice, there may be times when some or all balloons do not have the same user-data in their location-aware caches. Further, in some embodiments, location-aware caching may be implemented in such a way that different balloons in the same geographic coverage area should have location-aware caches that differ from one another (at least partially).

In a further aspect, when a balloon anticipates that it about to move into a new geographic area, and thus is leaving its current geographic area, it may also determine that another balloon is moving into the balloon's current area to its place. For example, two balloons may determine, e.g., based on their respective locations, current speeds, and/or directions of movement, both balloons), that one balloon is about to leave a certain geographic area, and that the other balloon is about to move into that geographic area. In this scenario, the balloon that is leaving the area may determine that the other balloon is about to take its place, and may responsively and proactively send the send user-data for the area to the other balloon, such that the other balloon can update its location-aware cache with user-data for the area it is about to move into.

Further, in the above scenario, the balloon that is about to leave a geographic area may implement a cache-update request strategy in which it first sends a location-aware cache-update request to the balloon that is about to leave the geographic area. Then, if the entering balloon does not receive some or all of the user-data for the area from the leaving balloon, the entering balloon may expand the scope of its cache-update request strategy. More specifically, it is possible that the leaving balloon may have already started re-populating its location-aware cache and removed user-data from the area it is leaving. As such, the leaving balloon and may not have some or all of the user-data for the area when it receives the cache-update request from the entering balloon. In this scenario, the entering balloon may send the leaving balloon an indication that some or all of the requested user-data is not available, and the leaving balloon responsively expand the scope of its cache-update request strategy, e.g., by sending location-aware cache-update requests to additional balloons.

More generally, balloons may utilize historical location data for balloons in order to implement a cache-update request strategy in which cache-update requests are initially sent to a balloon or balloons that have more recently been located in the geographic area for which user-data is desired. According to this cache-update request strategy, a balloon may then expand the scope of its cache-update requests to include balloons that have been located in the area less recently.

In a further aspect, to facilitate balloon-to-balloon sharing of user-data from a location-aware cache, at least one balloon, and possibly all balloons, may initially be provided with data defining the geographic areas in the balloon network. (In the event that a balloon is not pre-loaded with the data defining the geographic areas, it is possible that such a balloon can obtain this data from another balloon.) Such data may define boundaries of the geographic areas by indicating the GPS coordinates of bounding edges. Provided with both data that defines the geographic areas and its own GPS coordinates, a balloon may determine which geographic area includes its location. Similarly, if a given balloon is provided with the GPS coordinates of another balloon, the given balloon may determine which geographic area the other balloon is located in. Further, the given balloon may determine whether the other balloon is in the same geographic area as the given balloon, an adjacent geographic area, or some other geographic area.

In some embodiments, a background process may also track how long a balloon remains in a given geographic, after an update to its location-aware cache. As such, a balloon can send a location-aware cache-update request when it remains in the same geographic area for more than a threshold period of time after it last updated its location-aware cache. In practice, this may simply involve the balloon sending periodic location-aware cache-update requests in order to keep it location-aware cache updated.

In a further aspect, a balloon may update its location-aware cache by storing user-data that it routes to and/or from computing systems of end users in its current geographic area. In some instances, this functionality may allow a balloon to maintain an up-to-date location-aware cache for its current geographic area, without sending any subsequent location-aware cache-update requests. (Note that for purposes of updating a balloon's location-aware cache, the "current" geographic area may be the geographic area in which the balloon is currently located, or may be a geographic area into which the balloon is expected to move, such as when a balloon is located in a border area and moving towards a certain geographic area.)

For example, when the balloon moves into a given geographic area it may acquire pre-existing user-data from the geographic area from another balloon or balloons, or from a ground-based station, and then store this user-data in its location-aware cache. If all user-data that should be kept in the location-aware cache for a given balloon is routed through the balloon (such as could be the case if a balloon is the only balloon serving a certain geographic area), then the balloon can keep update its location-aware cache by analyzing the user-data data that is routed through it, and storing the appropriate user-data.

However, in many implementations, there may be a number of balloons operating in a given geographic region, and not all user-data will necessarily be routed any one given balloon. Accordingly, after a balloon's initial location-aware cache-update request, the balloon may periodically send additional location-aware cache-update requests to other balloons in the geographic area and/or to a ground-based station associated with the geographic area. By doing so, the balloon may update its location-aware cache with user-data from the geographic area that was not routed through the balloon, but was routed through another balloon in the geographic area.

iii. Maintenance of a Location-Aware Cache as a Balloon Moves from Area to Area

Figure 5B:
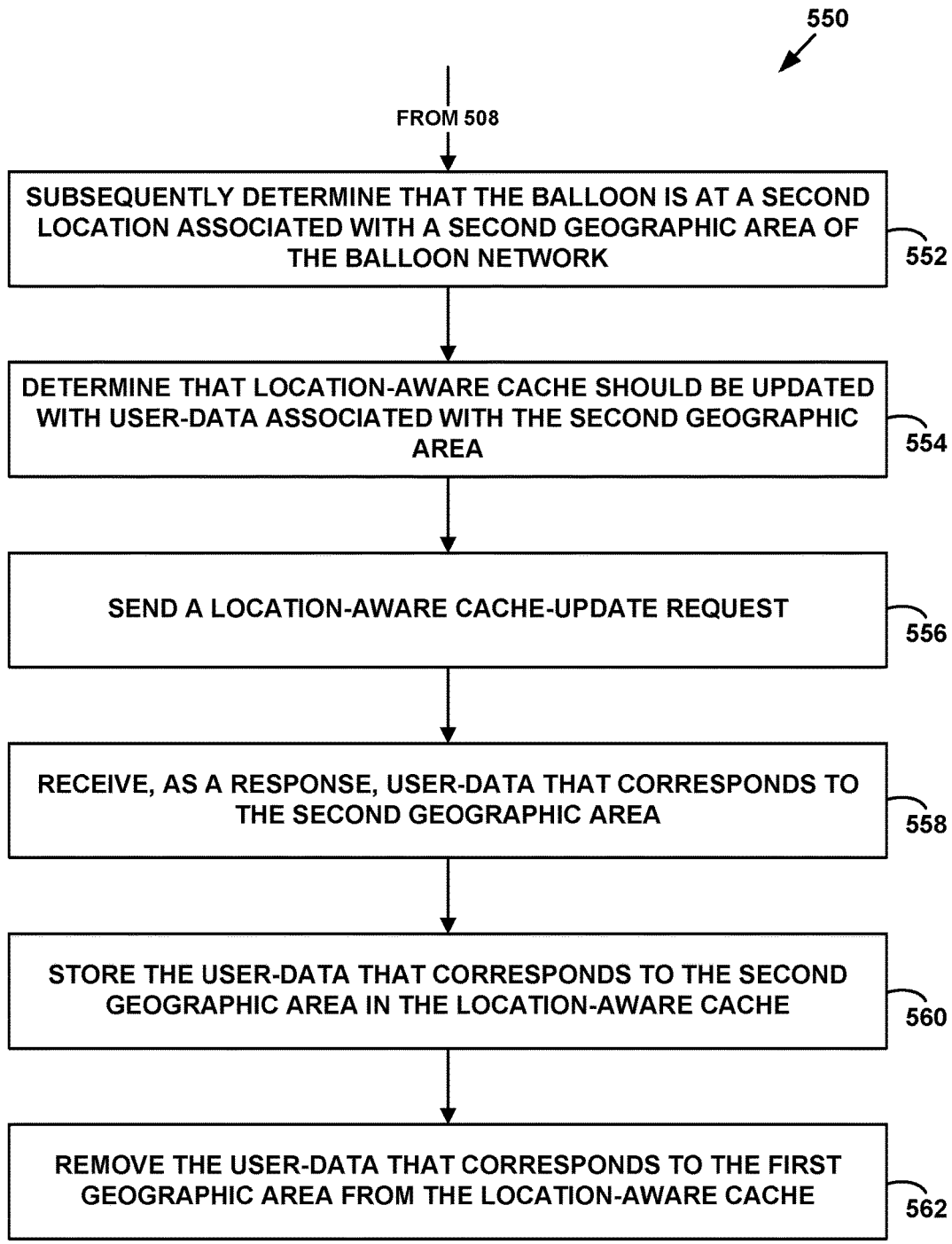
FIG. 5B is another simplified flow chart illustrating a method, according to an exemplary embodiment.

In a further aspect, when a balloon moves to a new geographic area, the balloon may update its location-aware cache by both (a) storing user-data associated with the new geographic area, as illustrated by method 500, and (b) removing user-data from a geographic area or areas in which it was previously operating. For example, FIG. 5B is another simplified flow chart illustrating a method 550, according to an exemplary embodiment. Generally, method 550 is representative of functions that may be carried out when a balloon determines that it has moved or is soon likely to move into a different geographic area.

More specifically, method 550 illustrates a scenario where a balloon, which has updated its location-aware cache with user-data from a first geographic area (e.g., at block 508 of method 500), detects that it has moved or is likely to move into a second geographic area. In particular, the balloon may subsequently determine that it is at a second location that is associated with a second geographic area of the balloon network, as shown by block 552. The balloon may then determine that it should update its location-aware cache with user-data associated with the second geographic area, as shown by block 554. Responsively, the balloon may send a location-aware cache-update request message, as shown by block 556. The balloon then receives, as a response to the location-aware cache-update request message, user-data that corresponds to the second geographic area, as shown by block 558. The balloon then stores the user-data that corresponds to the second geographic area in its location-aware cache, as shown by block 560. Further, the balloon may remove the user-data that corresponds to the first geographic area from the location-aware cache of the balloon, as shown by block 562.

In some implementations of method 550, a balloon may respond to the determination that the balloon should update its location-aware cache by storing user-data associated with the second geographic area in its location aware cache at block 560, and also by removing user-data associated with the first geographic area at block 562. For example, consider the scenario where the balloon moves from the first geographic area into a border area between the first and second geographic areas. In this scenario, the balloon responsively: (a) request user-data associated with the second geographic area and (b) remove the user-data that corresponds to the first geographic area from its location-aware cache.

In other implementations of method 550, a balloon may separately determine whether and when to remove the user-data that corresponds to a previous geographic area (e.g., the first geographic area). For example, in the above scenario where the balloon moves into the border area between the first and second geographic areas, the border area may be an area where the first and geographic areas overlap. Thus, while the balloon is located in the border area, the balloon is effectively location in both the first and the second geographic areas. As such, the balloon may responsively request user-data from the second geographic area when it enters the border area. However, the balloon may wait until it subsequently determines that it has moved to a location within the second geographic area, and is completely outside of the first geographic area, before removing the user-data that corresponds to the first geographic area from the location-aware cache of the balloon.

In a further aspect, some implementations may involve a balloon keeping user-data from more than one geographic coverage area in its location-aware cache. For example, a balloon could implement an exemplary method 500 to maintain a location-aware cache with user-data from its current geographic area as well as its previous geographic area. In such an implementation, block 560 may thus involve removing user-data that is associated with the geographic area in which the balloon was located prior to its previous geographic area.

As another example, balloon could implement an exemplary method 500 to maintain a location-aware cache with user-data from its current geographic area as well as one or more neighboring geographic areas (e.g., geographic areas that are adjacent to its current geographic area). In such an implementation, block 560 may thus involve removing user-data that is associated with geographic areas that are not neighbor sectors of the balloon's current geographic area. Other implementations in which balloons keeps user-data from more than one geographic coverage area in their location-aware caches are possible as well. (Note that herein, for purposes of updating a balloon's location-aware cache, the "current geographic area" may be the geographic area in which the balloon is currently located, or may be a geographic area into which the balloon is expected to move (such as when a balloon is located in a border area and moving towards a certain geographic area)).

In a further aspect, the rate at which a location-aware cache is updated may vary based on certain factors, such as the amount of network resources that can be utilized to relay user-data to balloons for storage in their location-aware caches. More specifically, moving user-data around between balloons to maintain a location-aware cache for a given geographic area will typically require a certain amount of bandwidth. Therefore, while location-aware caching may reduce network traffic level by storing user-data near to areas where it is likely to be utilized, scenarios may exist where the reduction in network traffic from caching is offset by the increase in traffic level required to move user-data to and from balloons, which in turn can make location-aware caching counterproductive to the overall level of network traffic. Accordingly, balloons and/or control systems may dynamically adjust the rate and/or amount of user-data that is sent to and/or from balloons, in an effort to optimize the efficiency provided by location-aware caching.

For instance, user-data may be sent at a rate that is selected in an effort to minimize traffic at various bottlenecks in a balloon network. As an example, referring to FIG. 4, such bottlenecks might occur at super-node balloons because the optical link(s) to other super-node balloons may have significantly higher bandwidth than the RF links to sub-node balloons (and the RF links from the sub-node balloons to ground-based stations. As such, a balloon may dynamically adjust the rate at which user-data is requested and/or sent based on the extent to which such a bottleneck exists (e.g., by lowering the rate when a bottleneck is detected, and vice versa).

b. Control of Location-Aware Caching by Ground-Based Stations or Other Balloons

Figure 6:
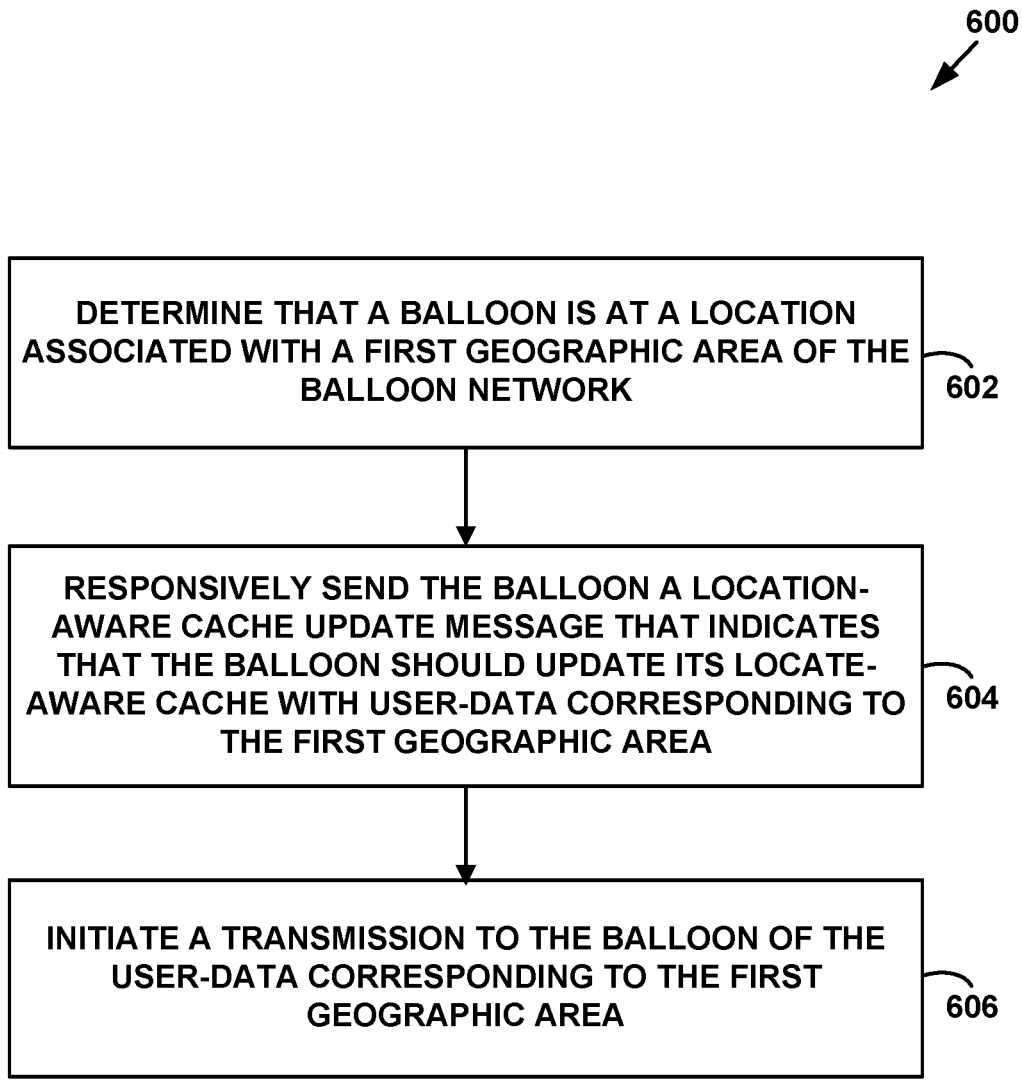
FIG. 6 is another simplified flow chart illustrating a method, according to an exemplary embodiment.

In a further aspect, some exemplary methods may be implemented by a ground based station, or possibly a balloon designated for network-wide or regional control of location-aware caching in other balloons. For example, FIG. 6 is another simplified flow chart illustrating a method 600, according to an exemplary embodiment. Method 600 is described by way of example as being carried out by a control system to facilitate location-aware caching by a balloon in a balloon network. The control system may be implemented in a ground-based station, or may be implemented in one or more balloons that are deployed in the balloon network. Such a control system may take other forms as well.

As shown in block 602 of method 600, the control system determines that a location-aware cache of a balloon should be updated. In response, the control system may send the balloon a location-aware cache-update message, which indicates that the balloon should update a locate-aware cache of the balloon with user-data corresponding to the first geographic area, as shown by block 604. The control system may then initiate a transmission of the user-data corresponding to the first geographic area, to the balloon, as shown by block 606.

To facilitate method 600, balloons may be configured to periodically report their location to the control system. As such, the control system can determine, e.g., when a balloon moves into a geographic area, or when a balloon moves into a border area, and responsively send the balloon a location-aware cache-update message.

In a further aspect, the transmission of the user-data corresponding to a certain geographic area may be conditioned upon receipt of the location-aware cache update request from the balloon. More specifically, after the control system sends the balloon a location-aware cache-update message, the control system may wait for the balloon to respond with a location-aware cache update request before initiating the transmission of user-data corresponding to the geographic area at block 606. Thus, if the balloon has already updated its cache (e.g., such as could be the case if multiple balloons and/or ground based stations attempt to send the same user-data to the balloon), the balloon may not respond. In this scenario, the control system may refrain from initiating the transmission, which may help to avoid duplicative transmissions of user-data to the same balloon.

V. Exemplary Methods for Location-Aware Service Profiles

Figure 7:
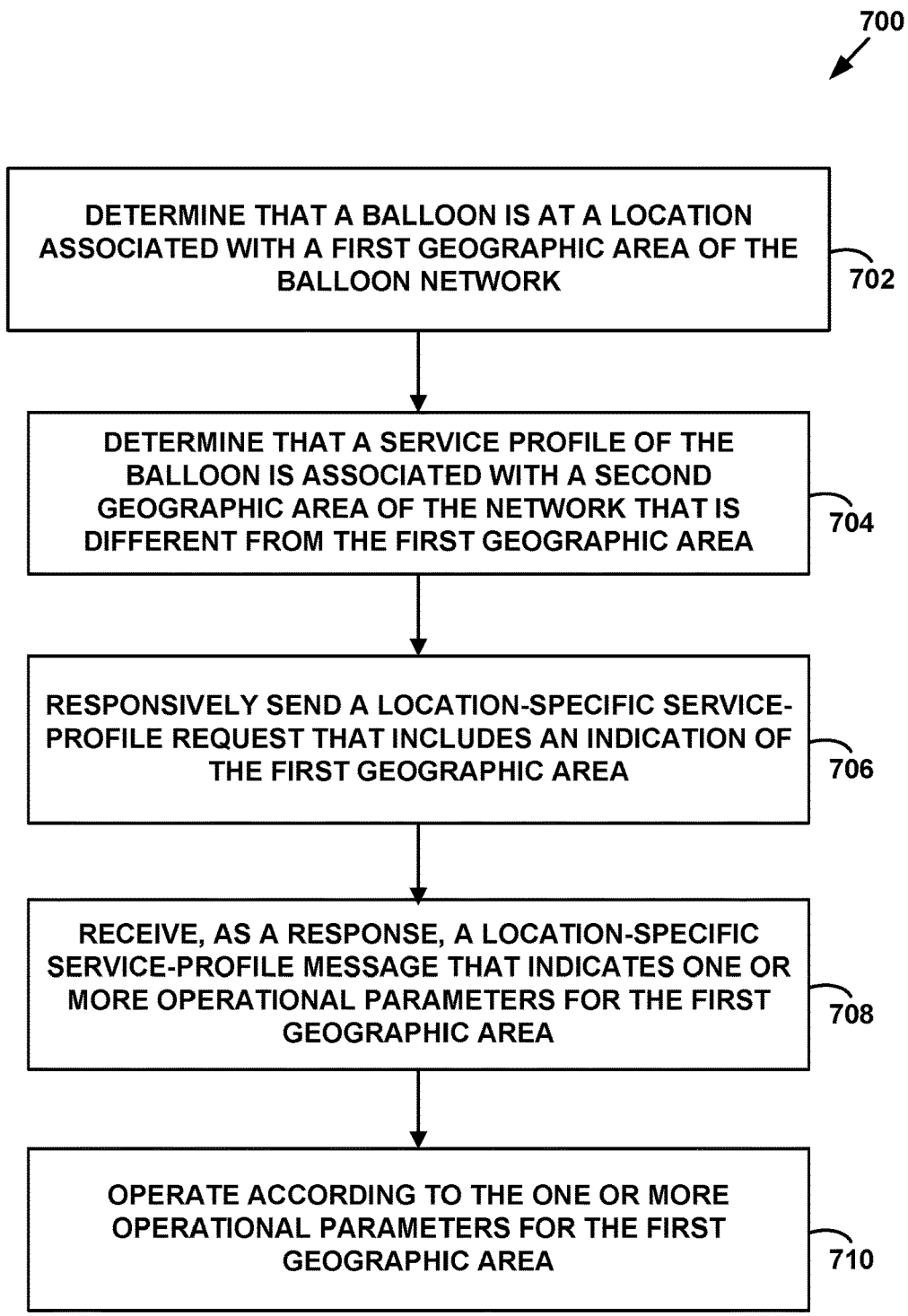
FIG. 7 is a simplified flow chart illustrating a method for updating a balloon's operation according to a location-specific service-profile, according to an exemplary embodiment.

As noted above, exemplary embodiments may further provide for location-specific service profiles. In a further aspect, a location-specific service profile for a given geographic area may be shared between balloons and/or obtained from a control system in a similar manner as user-data for a given geographic area is shared between balloons and/or obtained from a control system for purposes of location-aware caching, as described above. For example, FIG. 7 is a simplified flow chart illustrating a method 700 for updating a balloon's operation according to a location-specific service-profile, according to an exemplary embodiment.

More specifically, as shown in block 702 of method 700, the balloon may determine that it is at a first location associated with a first geographic area of a balloon network. The balloon may then determine that a service profile of the balloon is associated with a second geographic area of the network that is different from the first geographic area, as shown by block 704. Responsively, the balloon may send a location-specific service-profile request that includes an indication of the first geographic area, as shown by block 706. The balloon may then receive, as a response to the location-specific service-profile request, a service-profile update message that indicates one or more operational parameters for the first geographic area, as shown by block 708. Thus, the balloon may begin operating according to the one or more operational parameters for the first geographic area, as shown by block 710.

In an exemplary method 700, the service profile for a given geographic area may specify various operational parameters for balloons while operating in the area. For instance, a service protocol for a given geographic area may specify: (a) a communication protocol or protocols to be used for communications with ground-based stations and/or other balloons in the area, (b) parameters for routing between balloons and ground-based stations in area, (c) transmission power requirements (e.g., minimum and/or maximum transmission power), (d) error correction coding, (e) a desired topology for the portion of the balloon network serving the area, (f) identifying information and/or other information relating to ground-based stations or other fixed systems in the area, which the balloon can connect to (e.g., to connect with other networks), (g) power management of balloon while in the area, (h) parameters affecting the horizontal and/or altitudinal movement of the balloon (e.g., limits on speed, a maximum altitude, and/or a minimum altitude, etc.), and/or (i) parameters required in order to fall within a desired regulatory class set out by the government of the country in which the area is located, or to otherwise comply with legal requirements or regulations in the country, among others.

Figure 8:
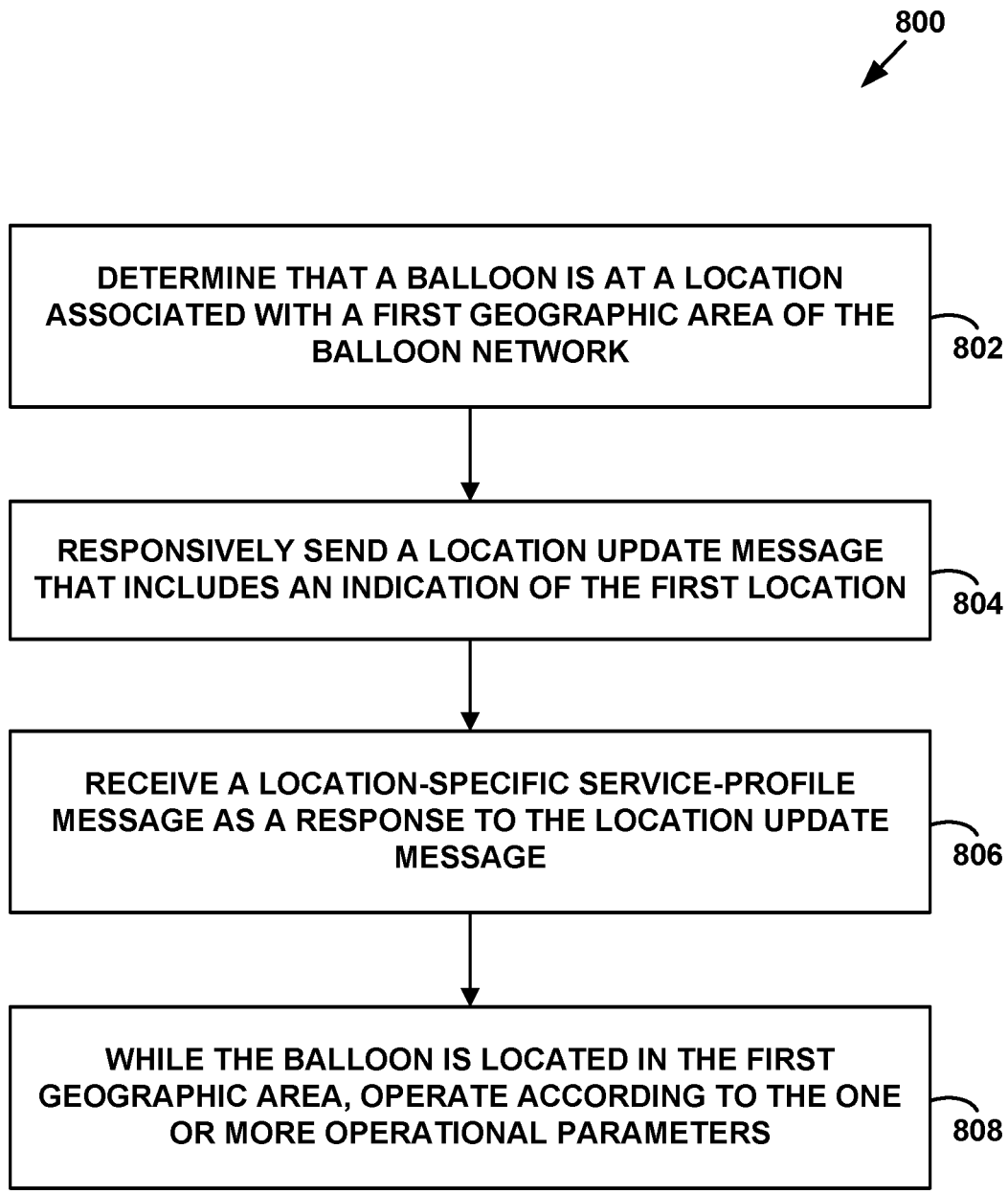
FIG. 8 is another simplified flow chart illustrating a method for updating a balloon's operation according to a location-specific service-profile, according to an exemplary embodiment.

FIG. 8 is another simplified flow chart illustrating a method 800 for updating a balloon's operation according to a location-specific service-profile, according to an exemplary embodiment. Method 800 is similar to method 700, except that the balloon does not specifically request that it be provided with a service-profile update message. Instead, the balloon periodically reports its location to its control system, which may determine whether the balloon needs to update its service profile.

More specifically, as shown in block 802 of method 800, a balloon determines that the balloon is at a first location associated with a first geographic area of a balloon network. Responsively, the balloon may send a location update message that includes an indication of the first location, as shown by block 804. The balloon may then receive a service-profile update message as a response to the location update message, which may indicate one or more operational parameters for the first geographic area, as shown by block 806. Accordingly, while the balloon is located in the first geographic area, the balloon may operate according to the one or more operational parameters, as shown by block 808.

VI. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A computer-implemented method comprising:
    at an aerial vehicle that is at a location associated with first geographic area in an aerial vehicle network, wherein the aerial vehicle network comprises a plurality of moveable aerial vehicles that provide service to client devices in a plurality of geographic areas, and wherein the aerial vehicle is one of the plurality of moveable aerial vehicles, determining that a location-aware cache of the aerial vehicle should be updated with user-data associated with the first geographic area; and
    in response to determining that the location-aware cache should be updated:
        sending a location-aware cache-update request;
        receiving, as a response to the location-aware cache-update request, user-data that corresponds to the first geographic area; and
        storing the user-data that corresponds to the first geographic area in a location-aware cache of the aerial vehicle; and
    wherein determining that the location-aware cache of the aerial vehicle should be updated with user-data associated with the first geographic area comprises determining that the aerial vehicle has moved from outside of the first geographic area to a location within the first geographic area.

2. The method of claim 1, wherein determining that a location-aware cache of the aerial vehicle should be updated with user-data associated with the first geographic area comprises:
    determining that the aerial vehicle has moved from a first location that is not associated with the first geographic area to a location within a border area of the first geographic area.

3. The method of claim 2, wherein determining that a location-aware cache of the aerial vehicle should be updated with user-data associated with the first geographic area further comprises:
    determining a direction in which the aerial vehicle is travelling; and
    determining that the direction in which the aerial vehicle is travelling is towards the first geographic area.

4. The method of claim 1, wherein sending the location-aware cache-update request comprises sending a location-aware cache-update request to one or more other aerial vehicles in the aerial vehicle network, wherein the user-data that corresponds to the first geographic area is received from one or more of the other aerial vehicles.

5. The method of claim 1, wherein sending the location-aware cache-update request comprises:
    sending a location-aware cache-update request to a ground-based station that is associated with the first geographic area, wherein the user-data that corresponds to the first geographic area is received from the ground-based station.

6. The method of claim 1, further comprising:
    subsequently determining that the aerial vehicle is at a second location associated with a second geographic area of the aerial vehicle network; and
    determining that the location-aware cache of the aerial vehicle should be updated with user-data associated with the second geographic area and responsively:
        sending a second location-aware cache-update request;
        receiving, as a response to the location-aware cache-update request, user-data that corresponds to the second geographic area; and
        storing the received user-data that corresponds to the second geographic area in the location-aware cache of the aerial vehicle.

7. The method of claim 6, further comprising:
    as a further response to determining that the location-aware cache of the aerial vehicle should be updated with user-data associated with the second geographic area, removing the user-data that corresponds to the first geographic area from the location-aware cache of the aerial vehicle.

8. The method of claim 6, wherein the location associated with a second geographic area of the aerial vehicle network is a location within a border area, wherein the border area is adjacent to the second geographic area, the method further comprising:
    subsequently determining that the aerial vehicle has moved to a location within the second geographic area of the aerial vehicle network; and
    in response to determining that the aerial vehicle is at the location associated with the second geographic area, removing the user-data that corresponds to the first geographic area from the location-aware cache of the aerial vehicle.

9. The method of claim 1, further comprising:
    subsequently determining that the aerial vehicle is at a second location that is not associated with the first geographic area; and
    in response to determining that the aerial vehicle is at the second location, removing the user-data that corresponds to the first geographic area from the location-aware cache of the aerial vehicle.

10. The method of claim 1, wherein the location-aware cache-update request further comprises an indication of a rate at which the user-data should be sent to the aerial vehicle.

11. The method of claim 1, further comprising:
    determining a network traffic level; and
    determining a rate at which the user-data should be sent to the aerial vehicle based on the network traffic level.

12. A system comprising:
    a non-transitory computer-readable medium;
    program instructions stored on the non-transitory computer-readable medium and executable by at least one processor to:
        determine that a location-aware cache of an aerial vehicle should be updated with user-data associated with a first geographic area of an aerial vehicle network, wherein the aerial vehicle network comprises a plurality of moveable aerial vehicles that provide service to client devices in a plurality of geographic areas, wherein the aerial vehicle is one of the plurality of moveable aerial vehicles, and wherein the determination that the location-aware cache of the aerial vehicle should be updated with user-data associated with the first geographic area comprises a determination that the aerial vehicle has moved from outside of the first geographic area to a location within the first geographic area; and in response to determining that the location-aware cache should be updated:
send a location-aware cache-update request;
receive, as a response to the location-aware cache-update request, user-data that corresponds to the first geographic area; and
store the user-data that corresponds to the first geographic area in a location-aware cache of the aerial vehicle.

13. The system of claim 12, wherein the location-aware cache-update request message is sent to one or more other aerial vehicles in the aerial vehicle network, and wherein the user-data that corresponds to the first geographic area is received from one or more of the other aerial vehicles.

14. The system of claim 12, wherein the location-aware cache-update request message is sent to a ground-based station that is associated with the first geographic area, wherein the user-data that corresponds to the first geographic area is received from the ground-based station.

15. The system of claim 12, further comprising program instructions stored on the non-transitory computer-readable medium and executable by at least one processor to:
after storing the user-data that corresponds to the first geographic area in a location-aware cache of the aerial vehicle, determine that the aerial vehicle is at a second location associated with a second geographic area of the aerial vehicle network; and
determine that the location-aware cache of the aerial vehicle should be updated with user-data associated with the second geographic area and responsively:
send a second location-aware cache-update request;
receive, as a response to the location-aware cache-update request, user-data that corresponds to the second geographic area; and
store the received user-data that corresponds to the second geographic area in the location-aware cache of the aerial vehicle.

16. The system of claim 12, further comprising program instructions stored on the non-transitory computer-readable medium and executable by at least one processor to:
in further response to determining that the location-aware cache of the aerial vehicle should be updated with user-data associated with the second geographic area, remove the user-data that corresponds to the first geographic area from the location-aware cache of the aerial vehicle.

17. A computer-implemented method comprising:
determining that a location-aware cache of an aerial vehicle should be updated, wherein the aerial vehicle is at a location associated with a first geographic area of an aerial vehicle network, wherein the aerial vehicle network comprises a plurality of moveable aerial vehicles that provide service to client devices in a plurality of geographic areas, and wherein determining that the location-aware cache of an aerial vehicle should be updated comprises determining that the aerial vehicle has moved into the first geographic area; and
in response to determining that the location-aware cache of the aerial vehicle should be updated:
sending the aerial vehicle a location-aware cache-update message, wherein the location-aware cache-update message indicates that the aerial vehicle should update a locate-aware cache of the aerial vehicle with user-data corresponding to the first geographic area; and
initiating a transmission to the aerial vehicle of the user-data corresponding to the first geographic area.

18. The method of claim 17, wherein determining that the location-aware cache of the aerial vehicle should be updated comprises:
determining that the aerial vehicle has moved from a first location that is not associated with the first geographic area to a location within a border area of the first geographic area.

19. The method of claim 18, wherein the method is implemented by a second aerial vehicle that is different from the aerial vehicle.

20. The method of claim 17, wherein the method is implemented by a ground station in the aerial vehicle network.

* * * * *

UNITED STATES PATENT AND TRADEMARK OFFICE
CERTIFICATE OF CORRECTION

PATENT NO. : 10,356,742 B2
APPLICATION NO. : 15/662035
DATED : July 16, 2019
INVENTOR(S) : Eric Teller et al.

Page 1 of 1

It is certified that error appears in the above-identified patent and that said Letters Patent is hereby corrected as shown below:

In the Claims

Column 29
Line 41: Now reads "a location-aware cache"; should read -- the location-aware cache --.
Line 49: Now reads "a location-aware cache"; should read -- the location-aware cache --.
Line 57: Now reads "a location-aware cache"; should read -- the location-aware cache --.

Column 31
Line 21: Now reads "a location-aware cache"; should read -- the location-aware cache --.
Line 37: Now reads "a location-aware cache"; should read -- the location-aware cache --.

Signed and Sealed this
Tenth Day of September, 2019

Andrei Iancu
*Director of the United States Patent and Trademark Office*